United States Patent
Welch et al.

(10) Patent No.: US 11,954,900 B2
(45) Date of Patent: *Apr. 9, 2024

(54) AUDIOVISUAL DETECTION OF EXPECTATION VIOLATIONS IN DISPARATE HOME AUTOMATION SYSTEMS

(71) Applicant: University of Central Florida Research Foundation, Inc., Orlando, FL (US)

(72) Inventors: Gregory Welch, Orlando, FL (US); Gerd Bruder, Orlando, FL (US); Ryan Schubert, Orlando, FL (US); Austin Erickson, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,746

(22) Filed: Sep. 6, 2023

(65) Prior Publication Data
US 2024/0071055 A1 Feb. 29, 2024

Related U.S. Application Data

(63) Continuation of application No. 18/240,731, filed on Aug. 31, 2023.
(Continued)

(51) Int. Cl.
*G06V 10/70* (2022.01)
*G06T 3/4038* (2024.01)
(Continued)

(52) U.S. Cl.
CPC .......... *G06V 10/774* (2022.01); *G06T 3/4038* (2013.01); *G06T 7/73* (2017.01);
(Continued)

(58) Field of Classification Search
CPC ........ G06T 7/0002; G06T 2207/20081; G06V 10/70; G06V 10/77; G06V 10/774;
(Continued)

(56) References Cited

U.S. PATENT DOCUMENTS

| | | | | |
|---|---|---|---|---|
| 2021/0063036 A1* | 3/2021 | Oh et al. | ................ | H04L 67/12 |
| 2021/0117717 A1* | 4/2021 | Ha et al. | ................ | G06N 20/00 |
| 2022/0067547 A1* | 3/2022 | Kwatra et al. | ........... | G06N 5/04 |

* cited by examiner

*Primary Examiner* — Andrew W Johns
(74) *Attorney, Agent, or Firm* — Anton J. Hopen; Smith & Hopen, P. A.

(57) ABSTRACT

The invention pertains to methods for monitoring the operational status of a home automation system through extrinsic visual and audible means. Initial training periods involve capturing image and audio data representative of nominal operation, which is then processed to identify operational indicators. Unsupervised machine learning models are trained with these indicators to construct a model of normalcy and identify expectation violations in the system's operational pattern. After meeting specific stopping criteria, real-time monitoring is initiated. When an expectation violation is detected, contrastive collages or sequences are generated comprising nominal and anomalous data. These are then transmitted to an end user, effectively conveying the context of the detected anomalies. Further features include providing deep links to smartphone applications for home automation configuration and the use of auditory scene analysis techniques. The invention provides a multi-modal approach to home automation monitoring, leveraging machine learning for robust anomaly detection.

17 Claims, 11 Drawing Sheets

Related U.S. Application Data

(60) Provisional application No. 63/402,692, filed on Aug. 31, 2022.

(51) Int. Cl.
*G06T 7/73* (2017.01)
*G06V 10/77* (2022.01)
*G06V 10/774* (2022.01)

(52) U.S. Cl.
CPC .............. *G06V 10/70* (2022.01); *G06V 10/77* (2022.01); *G05B 2219/2642* (2013.01); *G06T 2207/20* (2013.01); *G06T 2207/20081* (2013.01)

(58) Field of Classification Search
CPC ..... G06V 10/778; G10L 15/063; G06F 18/21; G06F 18/214; G06F 18/217; G05B 13/0265; G05B 19/04; G05B 2219/163; G05B 2219/2642
See application file for complete search history.

AUDIOVISUAL DETECTION OF EXPECTATION VIOLATIONS IN DISPARATE HOME AUTOMATION SYSTEMS

PRIORITY CLAIM

This application claims priority to U.S. Provisional Patent Application Ser. No. 63/402,692, entitled "Self-Aware and Informative Home Automation Systems" filed Aug. 31, 2022, and U.S. Non-Provisional patent application Ser. No. 18,240,731 entitled "Audiovisual Detection of Expectation Violations in Disparate Home Automation Systems" filed Aug. 31, 2023, the contents of which are herein incorporated by reference.

GOVERNMENT INTEREST

This invention was made with Government support under Grant No. N00014-21-1-2578 awarded by the Office of Naval Research and Grant No. 1800961 by the National Science Foundation. The Government has certain rights in the invention.

BACKGROUND OF THE INVENTION

1. Field of the Invention

The described embodiments generally relate to automation systems specifically to detecting anomalies by audio-visual capture of an automation system, training an unsupervised machine learning model and generating contrastive output of nominal and exceptional observations.

BRIEF SUMMARY OF THE INVENTION

Anomaly detection in heterogenous autonomous systems is achieved by several new and non-obvious systems. A first system extrapolates observations made of a home automation system to detect expectation violations and initiate communications or even remedial action. A second system approach executes a scripted training mode of a first home automation system to provide detectable cues to a second home automation system to provide a logical bridge between modalities in operation in the first system and environmental changes detectable in the second system. A third system approach trains the second home automation on expectations for nominal operation of the first system by unscripted training of a model during which time both systems are presumed to be operating properly.

For example, a function of a first autonomous system imparts a substantially reproducible change in an environmental condition. The environment condition may include light, temperature, vibration, imagery, humidity, proximity or sound. A second system having a sensor detects the change in the environmental condition. An anomaly manager communicatively coupled to the first autonomous system and the observing system has a first event listener that detects the execution of the function on the first autonomous system and a second event listener accessing values from the sensor on the observing system.

A logic engine operable in the anomaly manager returns a first operational state when the environment condition detected by the sensor is consistent with the anticipated environment condition responsive to the function of the first autonomous system operating properly and returns a second operational state when the environment condition detected by the sensor is inconsistent with the anticipated the environment condition responsive to the function of the first autonomous system operating properly. Finally, an alert module communicatively coupled to the anomaly manager signals an output device when the second operational state is returned by the logic engine. The alert module optionally sends a designated human operator an alert message that includes options to take certain actions in response to the anomaly.

In one example, an energy consumption module communicatively coupled to the anomaly manager and integrated into the logic engine detects a change in energy consumption responsive to the function of the first autonomous system. The system processes energy consumption not just for measures of efficiency but for direct and indirect inferences of environmental state and operational status of other systems. For example, a door sensor that malfunctions and does not register an open state value during cold outside temperatures triggers an offline thermostat to activate a heat pump to warm the building interior. In this case, the operational state of two offline systems (door sensor and thermostat) are supplemented by detection of an electricity draw of magnitude and time consistent with a door left open in the winter.

Alternatively, if the thermostat was online as an IoT (Internet of things) device, the drop in temperature could be measured directly. In similar fashion, if the thermostat is set to activate heat at a threshold and there is a lack of energy consumption yet another anomaly is detected by inference. The detection is applied to the determination of whether the logic engine returns the first optional state or the second operational state. In an embodiment, a rendering engine communicatively coupled to the anomaly manager generates an XR-viewable spatial representation of the first autonomous system in the second operational state annotated with corrective annotations.

Another embodiment of the invention is adapted for configuring and integrating automation systems. That embodiment includes a first autonomous system performing a first function and broadcasting information such as its location, identity, parameters, functions, and operational specifications. A second autonomous system performing a second function broadcasts information such as its location, identity, parameters, functions, and operational specifications. An integration manager communicatively coupled to the first autonomous system and the second autonomous system receives the location, identity, and operational specifications for both the first autonomous system and the second autonomous system. A rendering engine communicatively coupled to the integration manager generates an XR-viewable spatial representation of the first autonomous system and the second autonomous system with information such as configuration and operational annotations displayed in context of each system to guide an end user to completing an integration task, diagnosing system anomalies or even planning additions or improvements between the two systems.

The invention includes methods for extrinsic monitoring of the operational status of home automation systems, either through visual or auditory means, using digital cameras and/or digital microphones located on the premises. The system works by first accessing image or audio data captured during an initial training period. This data represents nominal operations of a home automation system that is otherwise non-communicative with the capturing devices. A computer processor then processes this data, applying machine vision processes for visual data or auditory scene analysis for audio data, to extrapolate operational indicators that are representative of the home automation system's nominal functioning.

The processed operational indicators are used to train an unsupervised machine learning model, building a model of normalcy for the system. This training phase concludes when a stopping criterion is met. The stopping criterion can be met through several means: achieving a predetermined accuracy on a validation set (which may be at least 80%), training the model for at least 72 hours of observation, or when the model's loss function ceases to decrease for a predetermined number of epochs between 10 and 100.

Post-training, the system initiates real-time expectation violation monitoring, capturing and storing substantially real-time image or audio data. Should an expectation violation be detected, a contrastive collage or sequence is generated. This contrastive element juxtaposes a nominal operation (either visual or auditory) with an anomalous event, retrieved from the respective data stores.

Finally, the contrastive collage or sequence is transmitted to an end-user of the home automation system, effectively conveying the context of the expectation violation. Additionally, a deep link may be transmitted to the end-user, allowing them to launch a smartphone configuration application for the home automation system. The invention also provides for methods where the audio and visual contrastive elements can be combined into an audiovisual collage, offering a more comprehensive contextual conveyance of the expectation violation to the end-user.

The system operates as middleware, utilizing a series of software layers and data abstraction to instantiate an intermediary communication channel between discrete, non-integrated, and non-communicatively linked home automation systems. This is achieved through several components and stages.

Audiovisual Capture Apparatus. Integral to the first home automation system, this component encompasses modalities like high-resolution surveillance cameras and audio devices equipped with signal processing capabilities. These devices capture multifaceted video and audio signals, including specific frequency bands, image resolutions, and frame rates, depending on the operational needs.

Discovery Module Interface. The captured data is transmitted, often after preliminary processing, to a discovery module. This module leverages algorithms like image recognition, edge detection, and acoustic pattern matching to extrapolate operational indicators from the ambient environment. For example, it may apply Fourier transformations to detect specific sound signatures or use computer vision techniques to recognize particular visual cues or patterns.

Machine Learning Processing. Post-identification of these operational indicators, they are converted into structured data sets and disseminated to a machine learning module. This module is equipped with machine learning algorithms, such as neural networks, support vector machines, or decision trees, and has been trained on large data sets to recognize the customary operational pattern of the home automation system. The capability to detect anomalies or expectation violations in this habitual pattern involves statistical analysis, outlier detection, and pattern recognition techniques.

Communication and Proxy Establishment. On the event of an expectation violation report, the communication module, employing protocols such as MQTT (Message Queuing Telemetry Transport) or CoAP (Constrained Application Protocol), optionally initiates the establishment of a proxy communication channel, using techniques like VPN (virtual private network) tunneling or API (application program interface) bridging. This mechanism permits interaction and response between the first and second home automation systems, despite the absence of direct integration or coupling.

Adaptation and Feedback Loop. The discovery module continually monitors the second system through continuous data sampling and adaptive filtering, perpetually updating its database of operational indicators. In parallel, the machine learning module refines its knowledge base using techniques like online learning, thereby enhancing its discernment of normal patterns and deviations. Furthermore, the communication module can autonomously trigger specific responses in the first system based on the feedback from the machine learning module, employing rule-based engines or event-driven programming.

Integration with Various Systems: An embodiment of the invention facilitates communication between an array of systems within the home automation environment so when an expectation violation occurs, communication back to the observed, second home automation system is initiated. These include Smart Home Systems responsible for managing the automation of various household functions. Often, these systems use protocols such as Zigbee, Z-Wave, or Thread, which ensure communication between various devices. Integration with controllers like AMAZON's Echo or APPLE's HomePod is common, allowing users to command devices through voice or application interfaces.

Security Apparatus forms another significant component, including biometric scanners like fingerprint or facial recognition systems from manufacturers like HONEYWELL, and intrusion detection systems that utilize advanced sensors and algorithms. Adherence to security protocols like Security Assertion Markup Language (SAML) is essential to maintain secure communication across these devices. Climate Control Systems in the home automation framework typically utilize Proportional-Integral-Derivative (PID) controllers or fuzzy logic to regulate heating, cooling, and ventilation.

Illumination Systems rely on the Digital Addressable Lighting Interface (DALI) or Digital Multiplex (DMX) protocols to control lighting attributes. Manufacturers like PHILIPS employ these standards to ensure compatibility with different controllers. Entertainment Systems in the smart home environment often include Universal Plug and Play (UPnP) devices from brands like SONY and SAMSUNG. The UPnP standard enables integration of audio and video components and facilitates the sharing of media across different devices in the home.

Real-world Implementation Scenario. For example, in a security network equipped with high-definition cameras and intelligent motion detectors, the captured video data can be utilized to extract operational indicators representative of an automated sprinkler system's usual functioning using techniques like object tracking and temporal pattern analysis. The operational indicators, representing events like sprinkler activation and irrigation timing, are processed using time-series analysis in the machine learning module. If the security camera doesn't capture the sprinkler system functioning at the usual time, it triggers predefined automated actions, such as alert notifications through SMS or push services or engagement of another module to activate an auxiliary irrigation system using programmable logic controllers (PLCs) or similar automation equipment.

Adaptive and Interactive Response. Based on the system's configuration and integration level, it can instigate various remedial actions, ranging from generating detailed error logs and system notifications to interfacing with other interactive home automation systems to autonomously rectify detected anomalies, such as remotely adjusting settings through secure cloud interfaces.

By intertwining technologies across multiple domains, this system achieves a novel integration of otherwise non-communicative systems, greatly enhancing the overall effectiveness and efficiency of home automation paradigms.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
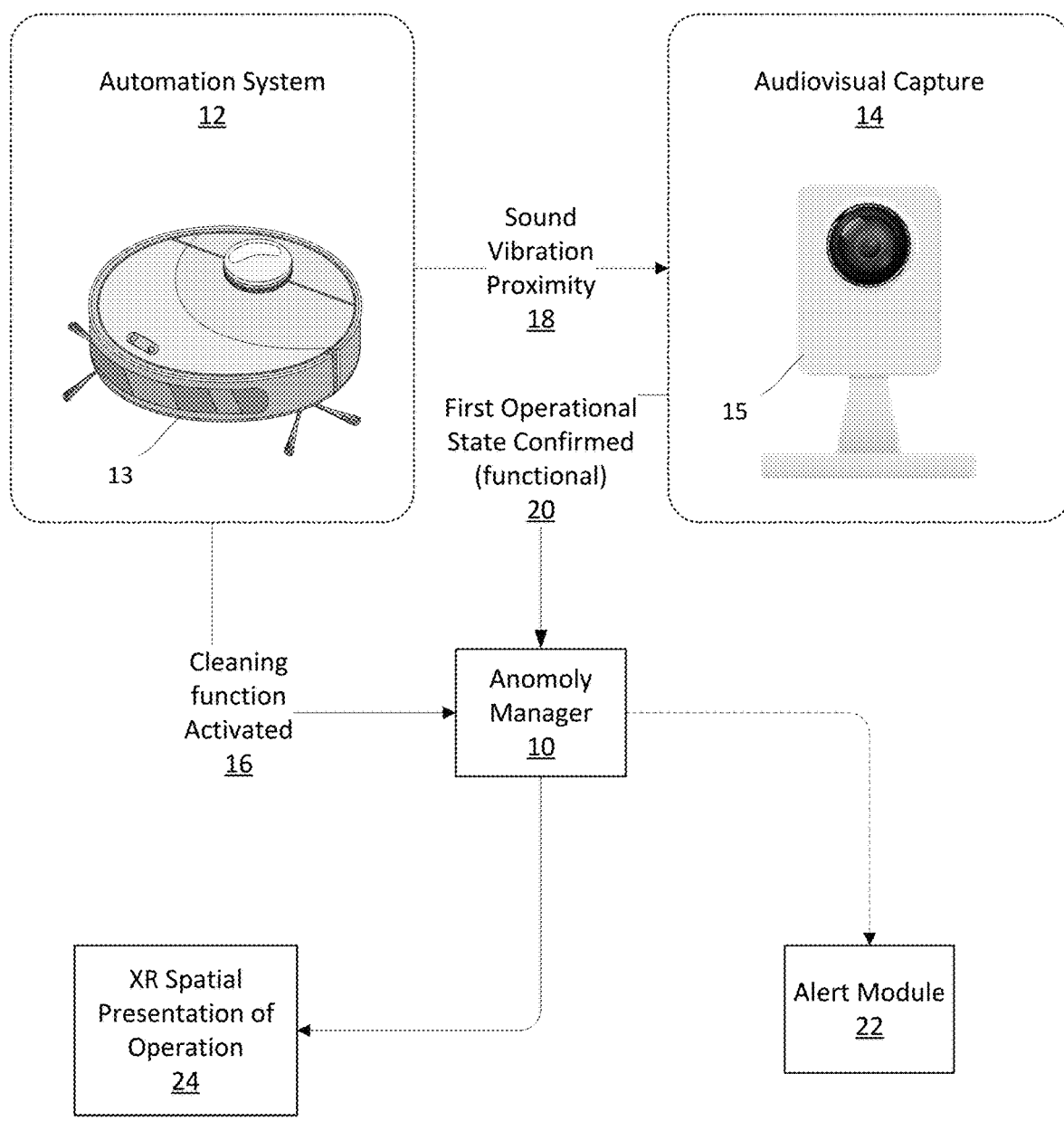
FIG. 1 is a diagrammatic view of an embodiment of the invention showing a robot vacuum generating anticipated environmental conditions confirmed by a home security system.

Today's homeowners or residents (system "users") are increasingly incorporating sophisticated home automation devices and robotics into their homes. For example, home automation systems based on protocols such as Insteon, Z-Wave, or Zigbee can turn lights off and on at different times. Beyond simple "if this do that" relationships, home automation programming can become quite complex, involving devices that act in ways that depend on various conditions including time of day, motion, temperature, and the geographic proximity of the residents ("geofencing"). The "connections" between devices, and the associated signals and events, are increasingly difficult to comprehend via conventional programming mechanisms, e.g., smart phone applications. This is true both at the time of programming and at the time of execution. Similarly, the use of home robotics system such as robotic vacuum cleaners can involve many conditions and constraints related to time of day, motion, pets, etc. Simply programming the planned robotic movement through the home, and understanding the actual robotic movement and actions through the home, can be difficult as one has to mentally connect maps shown on a smart phone to the actual home structure, furniture, etc. in the home. Visualizing the constraints associated with time of day, etc. makes this even more difficult.

Beyond the programming or setup phase of use, both home automation and home robotics systems often encounter anomalies during operation. For example, anomalies might occur due to user mistakes in programming, device or system failures, or environmental circumstances such as a lamp being unplugged or a toy blocking the path of a robot. More often than not a system does not even know there is an issue—if it commands another device or system to do something, it "assumes" it was done. In that case the user is usually the one to become aware, e.g., "Why didn't my lamp turn on at 6 pm like it was supposed to?" If a system is aware, the typical means for conveying the problem to a user is a textual message or perhaps a simple diagram on their smart phone, leaving the user to try and relate the message on their smart phone with the physical devices, structures, etc. in their home.

There are multiple complementary aspects of this invention that seek to address these problems. First, Augmented Reality (AR) systems and methods can be used by the residents to visualize otherwise invisible programmed electrical or logical connections between home automation devices, including robotics, and systems, along with the associated constraints, dependencies, etc. The same AR systems can be used to visualize the otherwise invisible real-time signals and events associated with the home automation/robotics devices and other systems.

Second, the manufacturers of discrete home automation devices, IoT devices, appliances, HVAC equipment, etc. could include mechanisms for storing or embedding (e.g. at the time of manufacture or shipping) and conveying helpful descriptive and operational information to the system being used to visualize otherwise invisible information. Such information could be made available via Bluetooth (near field) or other similar well-known technologies. For example. the manufacturer of a light switch, a kitchen appliance, or a robotic vacuum could embed persistent detailed static information about the device model, specifications, capacities, and capabilities. The devices/systems could also transmit detailed dynamic information about the real-time use and state of the device. Manufacturers of devices could also embed mechanisms for the storage, updating, and conveyance of longer-term dynamic information such as maintenance schedules or needs, device/system updates, and recall notices. All this information could be visualized using AR in situ at the device, along with all of the other invisible information about the connections, signals, pathways, etc. as described with the first aspect of the invention above.

Third, the home automation and robotics systems, including all sources, actuators, and sensors, can be used to automatically detect, and in some instances correct for, faults or anomalies. For example, cameras can be used to detect failures of lights to turn on, cameras can be used to detect the collision of a robotic vacuum with an un-anticipated object in the room (causing the vacuuming to be incomplete), microphones can be used to detect collisions or other physical anomalies, and motion sensors can be used to detect failures of cameras to "see" motion. When motion sensors trigger and cause lights to be turned on, both cameras and IR sensors might see the motion. These feedback mechanisms can be employed during normal use, e.g., a light that was programmed to turn on failed to do so, or in a "self-test" mode during times when there are no people in the home, e.g., the system could turn on a light and make sure the light (on) was "seen" in a camera.

Fourth, the AR mechanisms used to visualize otherwise invisible signals, pathways, etc., as described above, can be employed to help the user understand the detected failures/ anomalies. including where they happened in the home, what time, the nature of the failures/anomalies, and how they were detected (what makes the system "believe" there is a failure).

This applies to larger systems also, and systems where the failure symptoms are slower to manifest themselves, e.g., HVAC systems. Given one or more temperature sensors around the home/space, e.g., in thermostats. one can learn (e.g., machine learning) about changes in temperature that are expected when the system is working properly, and the home is secure but can also learn to detect windows/doors being open (from the temperature changes). One can also detect system (e.g., HVAC) failures, including "hard" failures or more gradual "soft" failing trends. One form of HVAC failure (e.g., loss of coolant) would have temperatures rise while energy also spikes (e.g., AC keeps running to no avail), another form of HVAC failure (e.g., compressor circuit breaker tripped) would see temp rise but no energy (electricity) use. The system can also learn to correlate environmental temperature changes with devices or conditions that are expected to alter the temperature, e.g., an oven or other appliance, or a window or door open. IR cameras/ sensors could also be used to spot temperature issues, detect lights or appliances on, etc. (IR sensors are commonly found already in some motion sensors, for example.) All of this could be integrated with other systems such as energy monitoring systems. e.g., <sense.com>. More direct causes and effects can be correlated and used to detect conditions through IoT or similar mechanisms, e.g., signal that appliance (e.g., washing machine) turned on should correspond to energy increase, door open sensor signal could (should, depending on time of day and weather for example) cause a short temperature and light change.

More generally. some things are intended to produce environmental effects. some things do unintentionally. Some have direct effects some are indirect. Some effects are unimodal some are multimodal. Some effects are short in duration. some have more lasting effects. All of these relationships might comprise one set of conditions when functioning properly, and another when there is an anomaly. Anomalies can correspond to failures, some to simply unexpected circumstances. The system can learn from unexpected conditions that are not failures. Help learning can come from various sources. e.g., the individuals in the home or crowd sourced learning. including people in other homes. One could use a simulator to both model effects, and to teach ML system about expected behaviors and anomalies.

For example, the state of exterior openings (e.g., doors or windows) might be correlated with temperatures rising or falling, light appearing or not, etc. Automatic shades/blinds should lower temperatures inside when it is hot and sunny outside, failure of them with sun will not. Appliances and other devices might make sounds, light, etc., everything from microwaves to TVs to robotic vacuums. Electricity use will change as devices change state (see "sense" company above). Mechanical changes, e.g., window/door open, robot vacuum moving, lamp moved, can have multiple effects, e.g., they might be seen in a camera, make sounds, change the temperature, etc.

Systems can know more/less about different objects, e.g., characteristics and state, and have different levels of confidence in those characteristics/states. E.g., a microwave oven is very unlikely to move, humans/animals/robots (e.g., a robotic vacuum) are very likely to move, and a floor lamp is in between—it won't normally move on its own, but it can be moved. Knowing such characteristics and current state can aid in detecting anomalies, e.g., because a lamp that is moved might appear to be "burned out" if not seen in one place, but might have simply been moved (and might appear somewhere else). Humans can help systems learn about objects, people, etc., e.g., directly by indicating or labeling, or indirectly through machine learning (with human "crowd" input from other homes/homeowners) can learn to recognize patterns. ML examples today for electrical energy (sense), water (Flume and StreamLabs), and temperature (HVAC). Today all perform ML for their own purpose. But what they recognize can be useful for other systems to know-if they share information the signals and information together can convey far more than any alone.

In some instances, the same home automation and robotics sources, actuators, and sensors, that are used to automatically detect faults or anomalies can also be used to automatically or optionally act on behalf of the user to correct the anomaly or mitigate unwanted effects caused by the anomaly. For example, if the system detects anomaly related to a possible water leak, e.g., a water sensor is triggered or a lawn sprinkler head has detached (FIG. 6-7), the system can command a solenoid or similar device to shut off the whole house water supply, or to shut off the supply to the problematic lawn sprinkler/irrigation circuit. In some circumstances the system can then take programmed or learned (e.g., via ML) action to take follow actions, e.g., command the lawn sprinkler/irrigation system to transition to the next scheduled irrigation task. Such corrective actions can be undertaken automatically, or the user can be notified and offered the option to take the corrective action. Classes of anomalies, or specific anomalies, can be assigned a severity rating (e.g, 1=information only, . . . , 10=critical action needed) that can be used to determine whether to act automatically or to involve the user in the decision.

Mechanisms such as connectivity graphs, for example, can be used to determine whether an anomaly appears to be associated with a specific device or a collection of devices, e.g., a single sensor/source failure vs. a controller (multiple sensors/sources) failure. (We refer to a "source" as any device/system that creates an effect, intentionally or not, e.g., a sensor can act as a source if it emits IR light.) Finally, all of the same systems and methods associated with the three complementary aspects of this invention can also be used/applied in other contexts, for example at a workplace, in a vehicle, in a building, or around a city.

Figure 2:
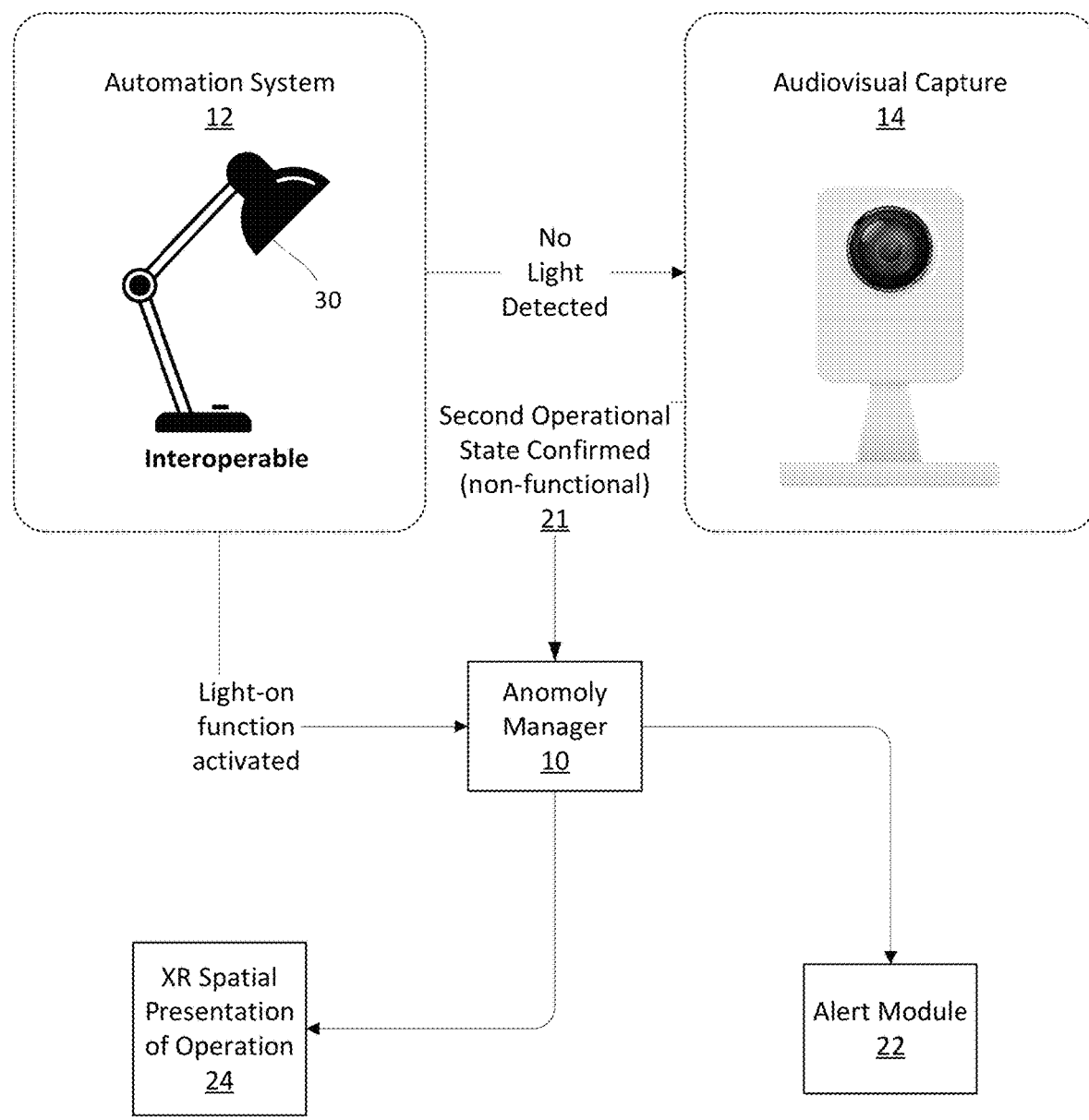
FIG. 2 is a diagrammatic view of an embodiment of the invention showing a home-automation-controlled light failing to generate anticipated environmental conditions, the anomaly confirmed by a home security system.

Turning to FIG. 1, anomaly manager 10 is communicatively coupled to both automation system 12 and audiovisual capture 14. As part of automation system 12, robot vacuum 13 received activation instructions 16 to clean. As a result, environmental parameters sound, vibration and proximity 18 are detectable by audiovisual capture 14 which is, in this example, a security camera 15. Data recorded initially by camera 15 is understood to be in a nominal operational state 20. Nominal operational state 20 is necessary so that deviations may be detected by anomaly manager 10 which are forwarded onto an alert module 22. Additionally, an XR spatial presentation of operation 24 may be generated in certain applications to provide additional information on the location and status of home automation components. In the example of FIG. 2, automation system 12 actuates lamp 30 on and off on a set pattern. Audiovisual capture 14 received timestamped images of the lamp or at least an area that would be illuminated by the lamp. Audiovisual capture 14 during an initial training prior or from a training set expects illumination at 9:00 PM every evening but does not detect it this case. The second operation state (non-functioning) is sent to anomaly manager 10. As audiovisual capture 14 has both an image of nominal operation from its prior training set or archived data and also a detected anomalous image of a non-illuminated state, anomaly manager 10 may generate a contrastive collage of both images and send them to alert module 22 which conveys them to end user by email, application notification, text messaging or the like. Thus, without pre-configuration or other human intervention, audiovisual capture 14 does not know the context of the anomaly. However, by conveying the contrastive collage of the nominal and anomalous images to the end user it conveys what it was expecting versus what it observed. In this manner, the audiovisual capture 14 may find anomalous events that were never anticipated or predicted by a human.

Figure 3:
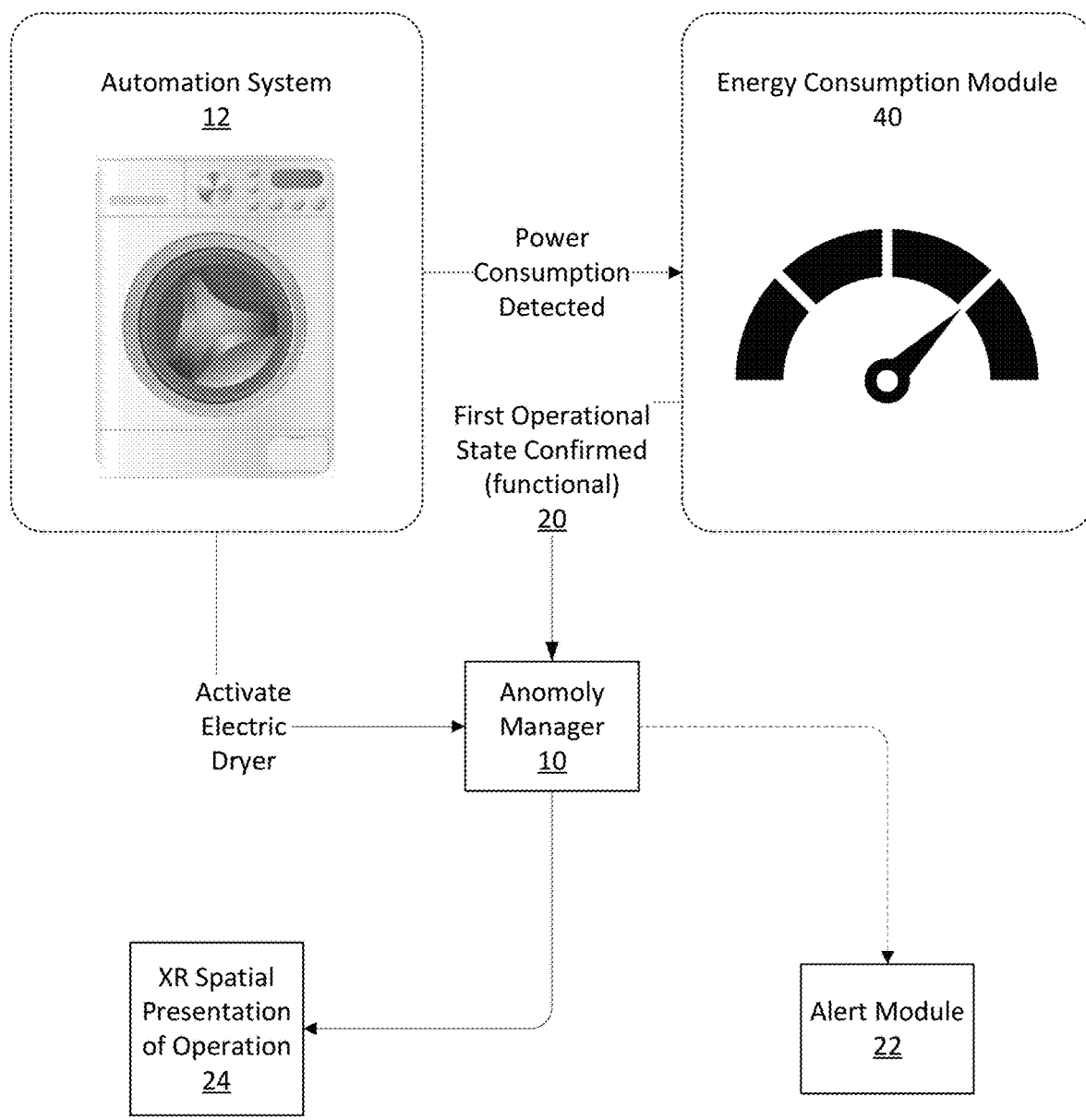
FIG. 3 is a diagrammatic view of an embodiment of the invention showing a home-automation-controlled electric clothes drying generating anticipated electrical draw confirmed by an energy consumption module.
Figure 4:
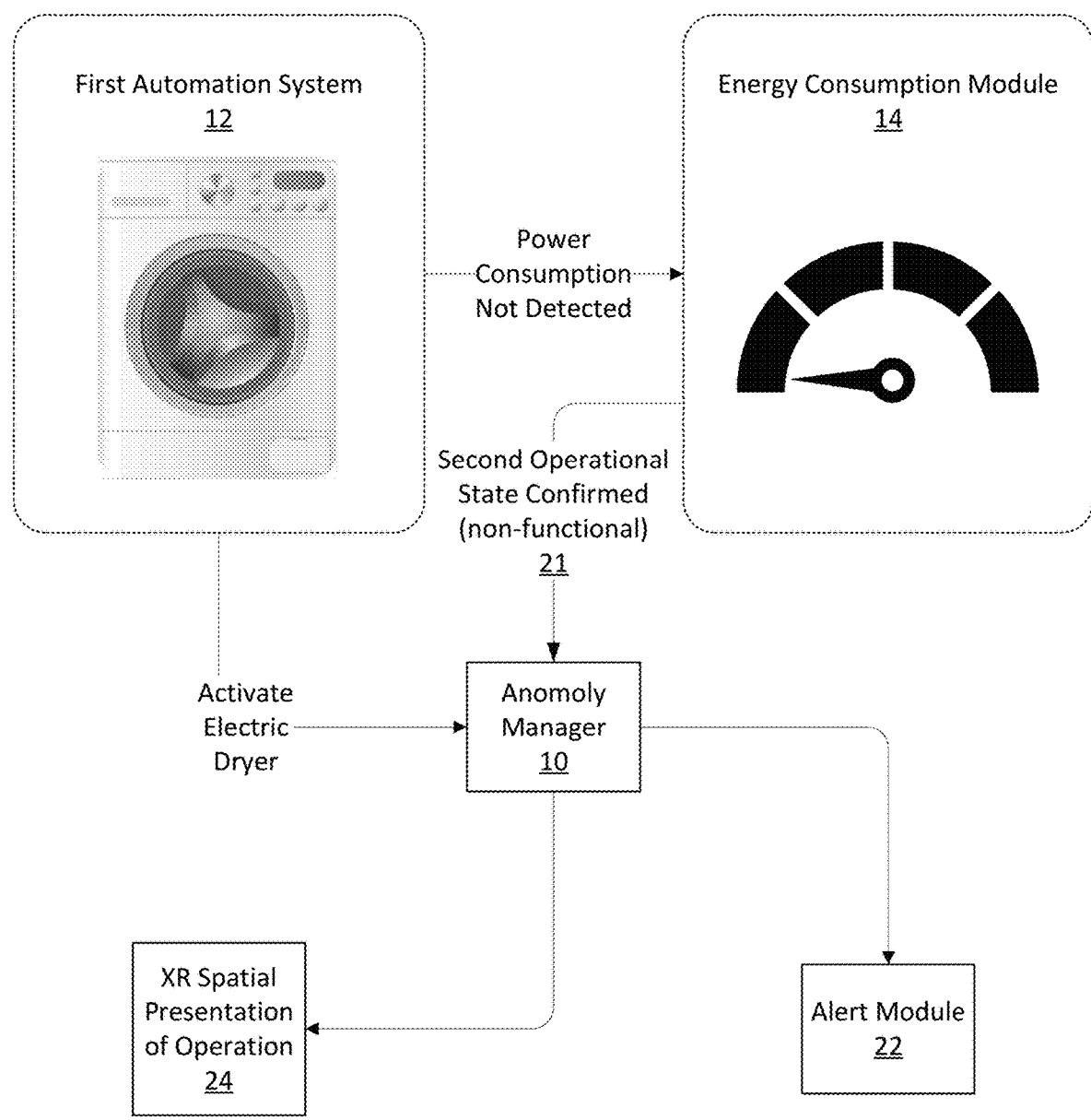
FIG. 4 is a diagrammatic view of an embodiment of the invention showing a home-automation-controlled electric clothes drying not starting and failing to draw electricity confirmed by an energy consumption module.

In FIG. 3, a similar principle is illustrated wherein the automation system 12 is a clothes dryer that consumes a relatively significant amount of energy in a typical household. In an embodiment of the invention, an application programming interface (API) connection for the clothes dryer conveys to the anomaly manager 10 that it has (or believes it has) started a drying cycle. Anomaly manager 10 also receives data from energy consumption module 40 communicatively coupled to a breaker system in a residence wherein energy draw is monitored. An unsupervised learning model receiving either API data or even audio or visual indicium eventually expects to observe concurrent initiation of a drying cycle with a draw on power from the breaker system. When a deviation or anomaly occurs, the alert module 22 conveys at least three values: (1) the event expected to occur (start of a drying cycle); (2) the energy draw expected as a result; and (3) the anomalous lack of energy draw which is shown in FIG. 4.

Figure 5:
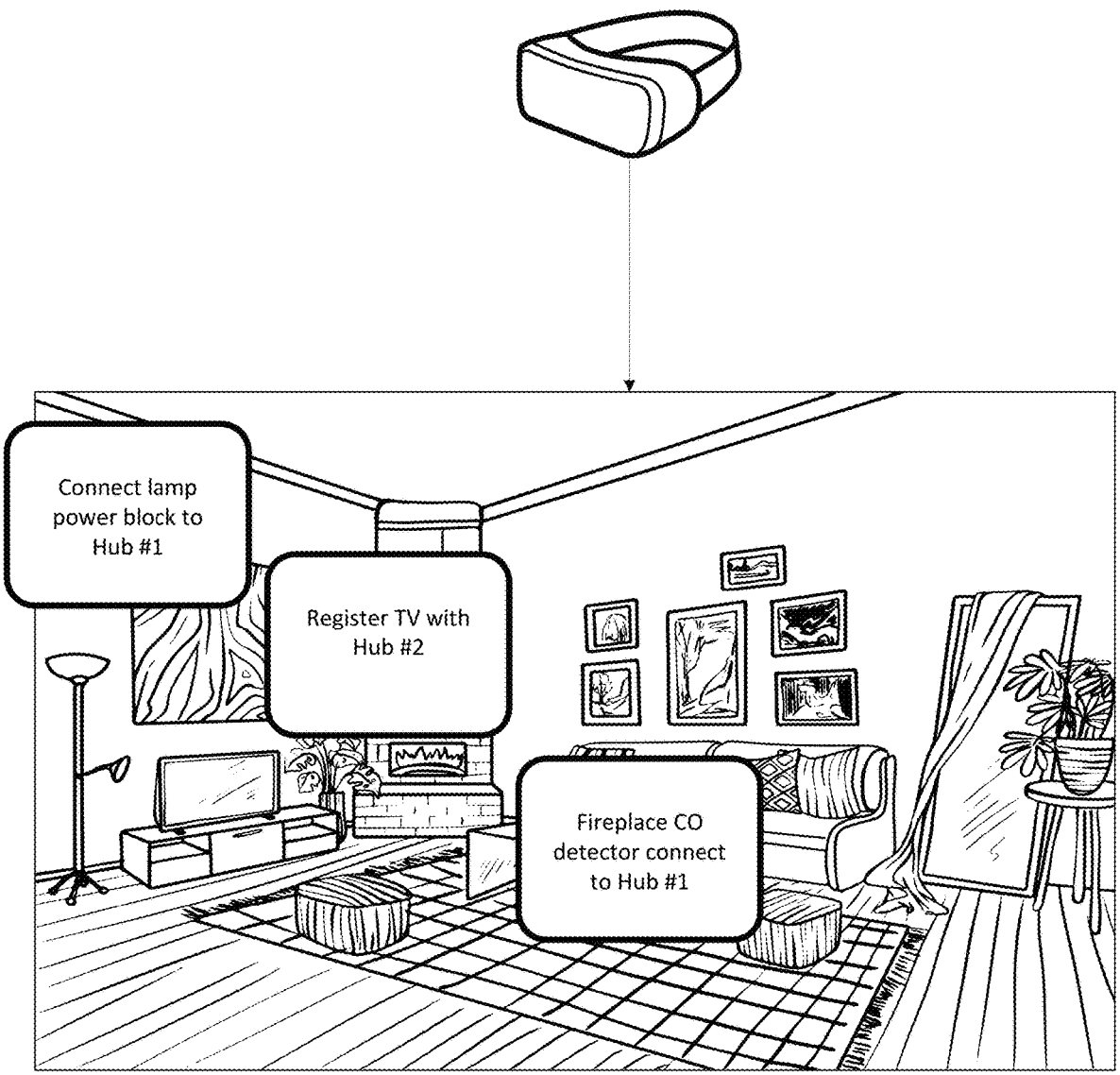
FIG. 5 is a diagrammatic view of an embodiment of the invention showing an augmented reality display of a plurality of home automation system annotated with call-out indicia spatially positioned to corresponding equipment and used for configuration, integration and anomaly investigation.

FIG. 5 is an illustrative view of an embodiment of the invention wherein devices in home automation systems are identified by an augmented reality system in a configuration process. Similar information may be conveyed once they are spatially registered on their operation whether nominal or non-functional.

Figure 6:
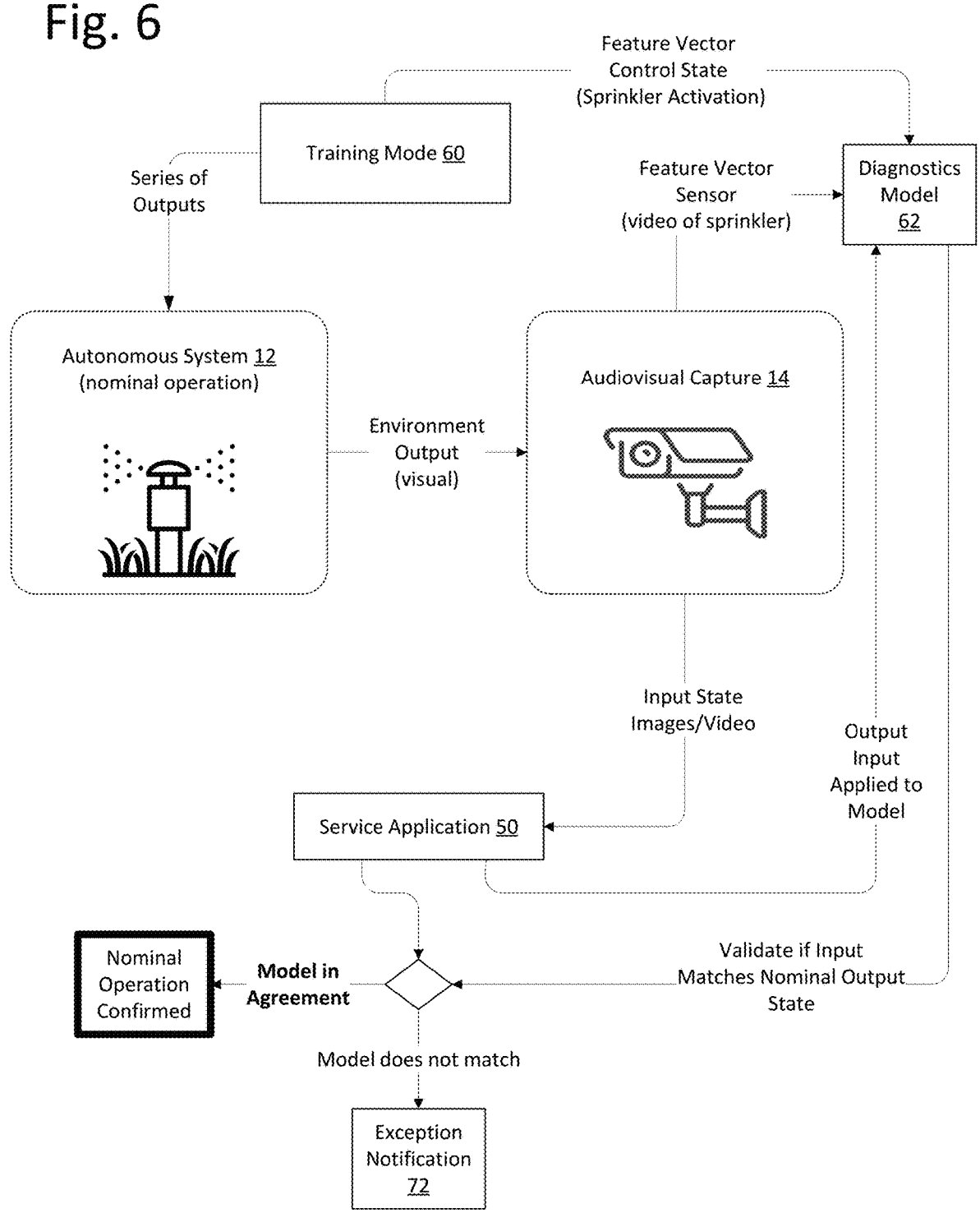
FIG. 6 is a diagrammatic view of an embodiment of the invention showing a training system to create a model of nominal operation between two heterogenous autonomous systems.
Figure 7:
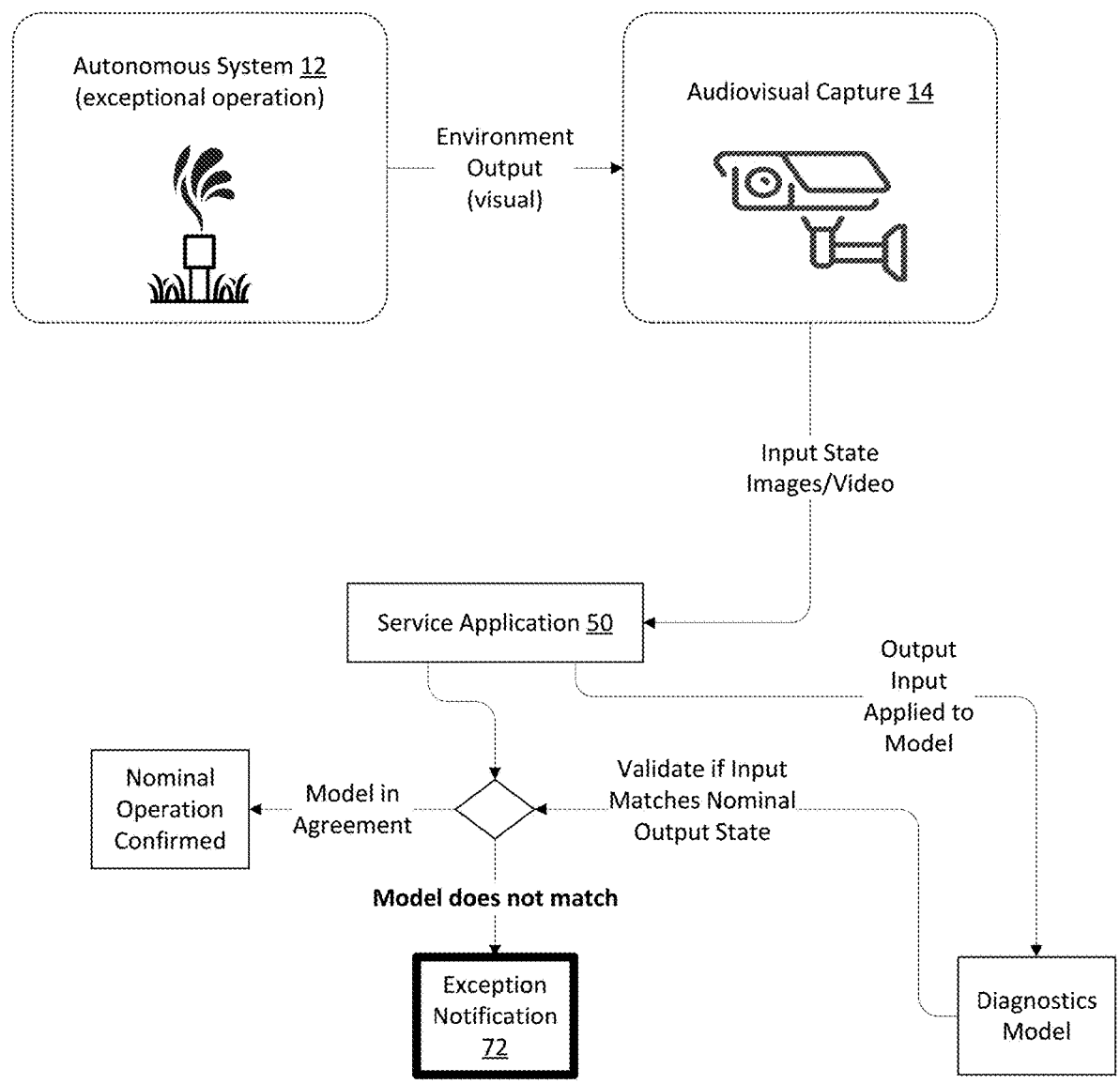
FIG. 7 is a diagrammatic view of an embodiment of the invention showing an exceptional operation detected using two heterogenous autonomous systems and a machine learning model.

FIG. 6 shows an embodiment of the invention wherein a training mode 60 cycles an automated sprinkler system through zones of operation which is labeled data of nominal operation which trains diagnostic machine learning model 62 based on images received from audiovisual capture 14. Thus, as shown in FIG. 7, when automated sprinkler system 12 exhibits anomalous operation observed by audiovisual capture 14 an exception notification 72 is generated.

In light of the capabilities intrinsic to unsupervised machine learning models, it becomes apparent that they offer substantial advantages in the realm of anomaly detection within home automation systems, encompassing devices such as robot vacuums, sprinkler systems, and automated lighting solutions. Deploying unsupervised algorithms for the real-time analysis of multi-modal sensor data-comprising video streams from surveillance cameras and digital microphone outputs-presents a scalable approach for monitoring the nominal operational state of various automated systems and flagging expectation-violating, anomalous events.

Incorporating a K-means clustering algorithm into the architecture allows for the categorization of multi-dimensional data points into a predefined number of clusters, thereby facilitating the identification of distinctive patterns corresponding to routine events or activities, such as the scheduled activation of sprinklers or the cyclical operation of robot vacuums. The iterative refinement of cluster centroids ensures optimal intra-cluster homogeneity and inter-cluster heterogeneity, thereby offering a robust model of 'normality' against which anomalous instances can be benchmarked.

In instances requiring a more nuanced understanding of different operational states or levels of automation interaction, hierarchical clustering could be integrated. This algorithm functions by constructing a tree (an undirected graph) based on distance metrics, effectively capturing hierarchical relationships between clusters and enabling the identification of nested levels of abstraction. Such functionality is valuable for deciphering complex dependencies between different rooms or operational states of multi-device automation schedules, enhancing the anomaly detection capacity of the system.

Dimensionality reduction techniques like Principal Component Analysis (PCA) offer computational efficiency and facilitate easy data interpretability by transforming the original feature set into orthogonal components, which are linear combinations of the original variables. By applying PCA on high-dimensional video frames and audio signals, a compressed representation retaining most of the original variance can be obtained. This facilitates the rapid identification of significant features indicative of anomalous behavior while minimizing computational overhead. For instance, if an unknown face appears on the surveillance camera or an unfamiliar voice is detected via the digital microphone, PCA could efficiently flag these as anomalies based on reconstruction errors.

Statistical-based anomaly detection mechanisms could be layered upon these clustering and dimensionality reduction techniques for more granular surveillance. One such mechanism involves Gaussian Mixture Models (GMM), which employ probabilistic models to understand the data distribution. Utilizing Expectation-Maximization, GMMs delineate multiple Gaussian distributions and their corresponding parameters, and classify data points based on the likelihood that they belong to these distributions. This approach is especially effective when the underlying data follows a complex, multi-modal distribution, such as varying lighting conditions during different times of the day.

In scenarios that demand the detection of hitherto unseen anomalies or require real-time analysis, ensemble methods like Isolation Forests or One-Class Support Vector Machines could be utilized. Isolation Forests are particularly effective in handling high-dimensional data, as they randomly partition the feature space and recursively isolate anomalies, thereby offering an efficient mechanism for real-time anomaly detection. On the other hand, One-Class SVMs train exclusively on the nominal state data to construct a hyperplane that separates normal behavior from outliers, making them adept at identifying novel types of anomalies.

Additionally, deep learning-based techniques like Autoencoders can be integrated for capturing intricate dependencies in the data. By learning a compressed latent representation of the normal operational state, Autoencoders facilitate the detection of subtle anomalies that other algorithms might overlook. For example, a slight but consistent deviation in the trajectory of a robot vacuum or the timing of sprinkler activation could be flagged as anomalies based on the reconstruction error metrics.

To complement the existing algorithms and offer a secondary layer of validation, t-Distributed Stochastic Neighbor Embedding (t-SNE) could be employed for the visualization of high-dimensional datasets. While not directly involved in anomaly detection, the reduced-dimensional representation provided by t-SNE could serve as a qualitative metric for assessing the performance of the deployed algorithms.

The synergistic integration of these unsupervised machine learning algorithms provides a robust and versatile framework for real-time anomaly detection in home automation systems. These algorithms operate in concert to learn the normal operational behavior across multiple devices and modalities, thereby facilitating the immediate identification and flagging of anomalous events that deviate from the established normative patterns.

Returning to FIGS. 6-7, to detect sprinkler system anomalies using unsupervised machine learning, we can use a video camera to record the sprinkler system. The video camera should be positioned to capture at least one zone in the sprinkler system and should be recording at a high enough frame rate to capture the sprinkler system turning on and off. The video footage can then be analyzed using unsupervised machine learning algorithms to identify anomalies.

One way to identify anomalies is to use feature identification. For example, we can extract features such as the number of sprinkler heads, the water pressure, and the duration of the watering cycle. We can then use these features to cluster the video footage into different groups. For example, we could cluster the video footage into groups of "sprinkler system is on" and "sprinkler system is off."

Once the video footage has been clustered, we can use anomaly detection algorithms to identify data points that are significantly different from the rest of the data. For example, we could use anomaly detection to identify a video clip where the sprinkler system is not turned on at 10 AM on a Sunday morning, even though it is supposed to be turned on. In addition to the features mentioned above, we can also extract features that indicate whether water is spraying from the sprinkler head. This could be done by analyzing the brightness of the video footage, or by using a machine learning algorithm to identify the presence of water in the video footage.

By extracting these features and using unsupervised machine learning algorithms, we can develop a system that can detect sprinkler system anomalies with high accuracy. This system can then be used to send alerts to the homeowner or to contact a service technician, preventing damage to the sprinkler system or the property.

Figure 8:
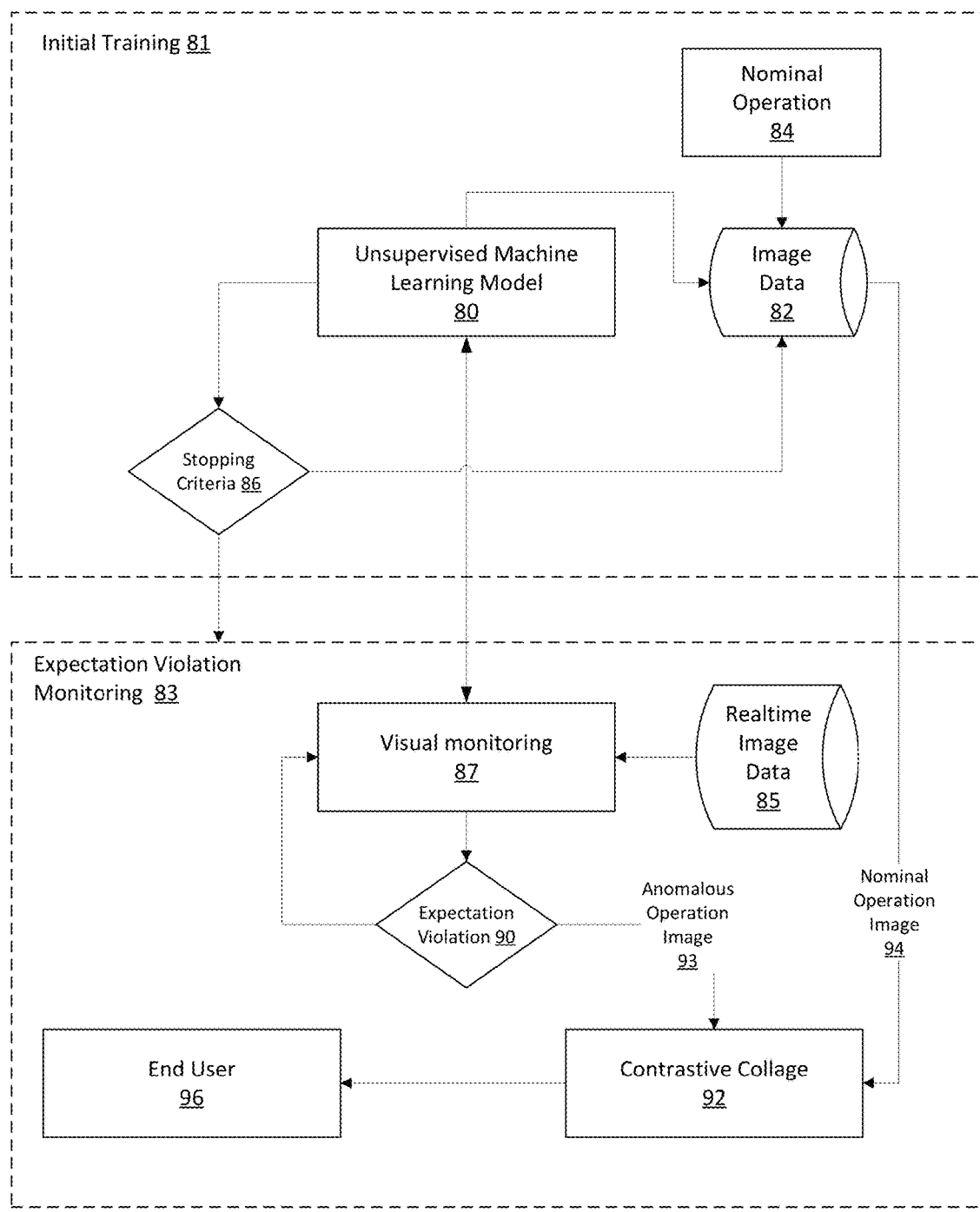
FIG. 8 is a flow chart view of an embodiment of the invention using unsupervised learning for visually detecting expectation violations of an automated system.

As shown in FIG. 8, an embodiment of the system works by first accessing image data 82 captured during an initial training period 81 or previously archived. This data represents nominal operations 84 of a home automation system that is otherwise non-communicative with the capturing devices. A computer processor then processes this data, applying machine vision processes for visual data or auditory scene analysis for audio data, to extrapolate operational indicators that are representative of the home automation system's nominal functioning.

The processed operational indicators are used to train an unsupervised machine learning model 80, building a model of normalcy for the system. This training phase concludes when a stopping criterion 86 is met. The stopping criterion can be met through several means: achieving a predetermined accuracy on a validation set (which may be at least 80%), training the model for at least 72 hours of observation, or when the model's loss function ceases to decrease for a predetermined number of epochs between 10 and 100.

Post-training, the system initiates real-time expectation violation monitoring 83, capturing and storing substantially real-time images 85 by visual monitor 87. Should an expectation violation be detected 90, a contrastive collage 92 is generated. This contrastive element juxtaposes a nominal operation image 94 with an anomalous event image 93, retrieved from the respective data stores.

Figure 9:
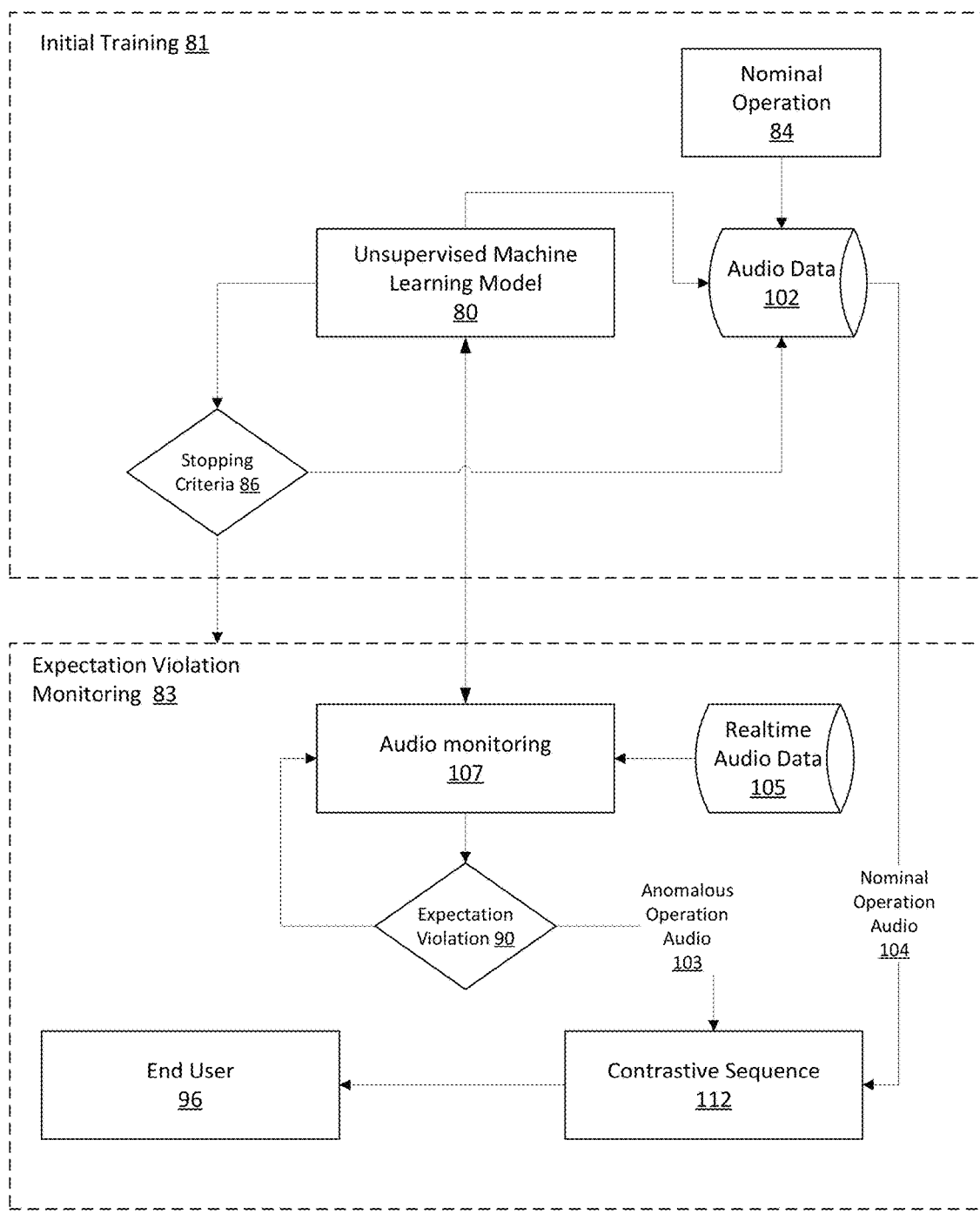
FIG. 9 is a flow chart view of an embodiment of the invention using unsupervised learning for audibly detecting expectation violations of an automated system.

Finally, the contrastive collage 92 is transmitted to an end-user 96 of the home automation system, effectively conveying the context of the expectation violation. FIG. 9 shows a similar system that uses audio instead of images. Here, audio data 102 is used to train the unsupervised machine learning model 80 and then audio monitor 107 detects expectation violations 90 from real-time audio data 105. Instead of a visual contrastive collage of images, a contrastive sequence of audio 112 is generated from what sound was expected (nominal operation audio 104) and from what sound was unexpected which is the anomalous operation audio 103. This contrastive sequence 112 is then sent to end user 96. The sequence 112 may be configured to always start with the expected nominal sound followed by the exception or vice-versus. Alternatively, an audio annotation may indicate which sound was expected and which was unexpected. It should be noted for example, that null values of nominal operation 84 may be valid, for example, in facilities or rooms that would normally be unoccupied wherein the presence of a sound during that time constitutes the expectation violation 90. Another aspect of the invention is that the unsupervised machine learning model 80 naturally looks for patterns over a particular time interval (e.g., daily, weekly or the like). Digital files whether images or audio nearly universally include timestamp data including the datetime of generation. Accordingly, an aspect of the invention is that the collage and/or sequence may not simply be a pair of media files but may include a plurality of nominal operation examples to contrast with the detected expectation violation.

In another embodiment of the invention, the expectation violation may be that of a deviation of anticipated audio or lack thereof. However, either in the alternative or in conjunction with the contrastive sequence of audio, a contrastive collage may also be informative to end user 96. For example, if a robot vacuum was scheduled to activate at 11:30 AM daily a home monitoring camera with an integrated microphone might pick up video images of its movement as well as its sound. A possible malfunction of the vacuum might be that it moves from room to room but its cleaning function is not activated so the sound difference (or absence) creates an audible expectation violation but not a visual expectation violation. Therefore, sending only the contrastive collage of images would not fully convey to the end user the possible problem.

Figure 10:
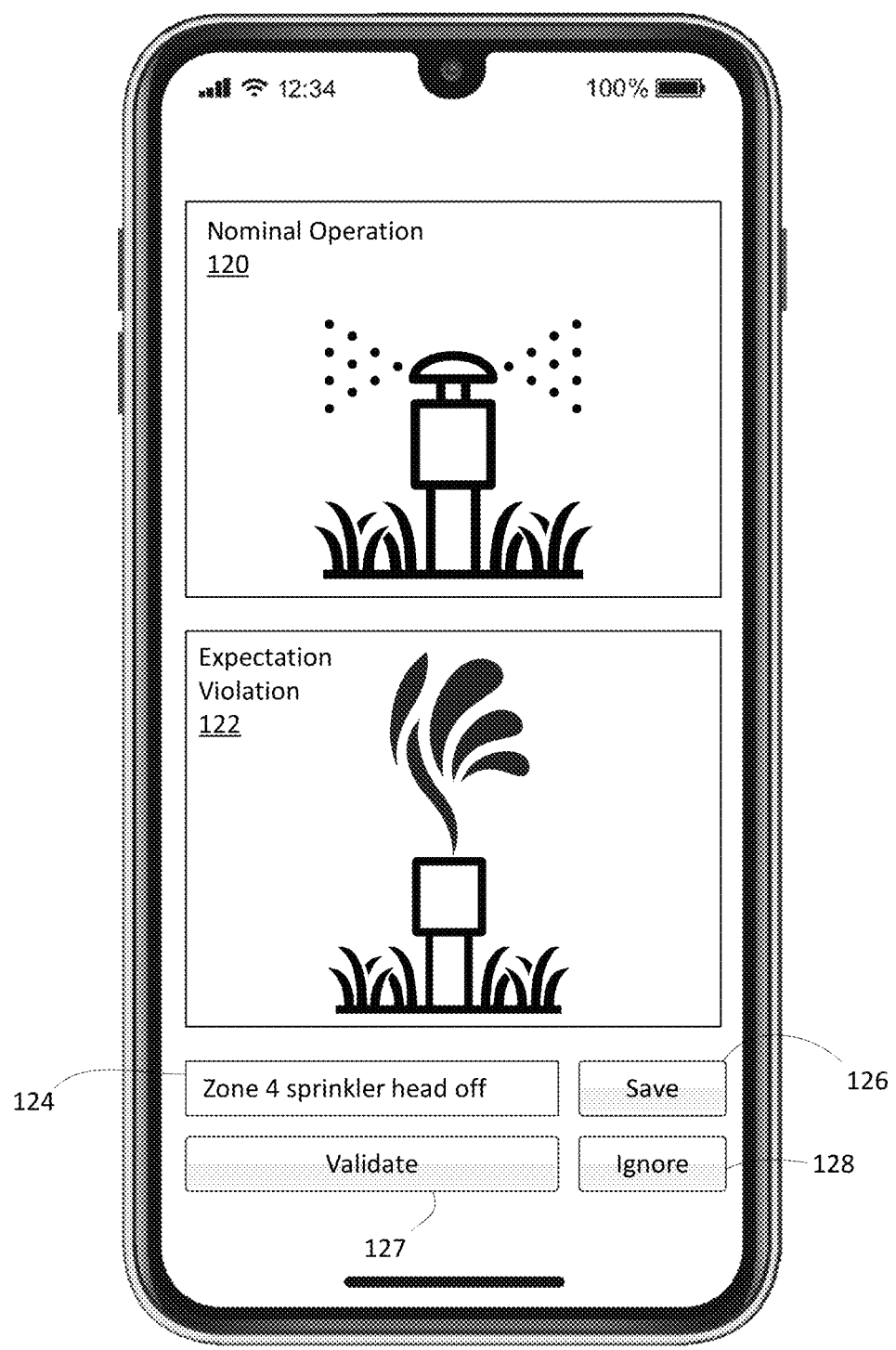
FIG. 10 is an illustration of a graphics user interface of a smartphone receiving a contrastive collage of images representing both nominal and exceptional observations.

FIG. 10 show an exemplary contrastive collage wherein an image of nominal operation 120 is displayed concurrently with the detected expectation violation 122 image. Optionally, end user may provide human feedback. Here, the end user may annotate a label 124 "Zone 4 sprinkler head off" to put context to the expectation violation and save 126 the annotation back to the system for future reference or to direct repair of the condition. Additionally, end user may validate 127 that an expectation violation has occurred (positive feedback) and give validation to the detection or may ignore 128 (negative feedback) to convey to the model it made a mistake and it needs to adjust its threshold for finding an expectation violation.

Figure 11:
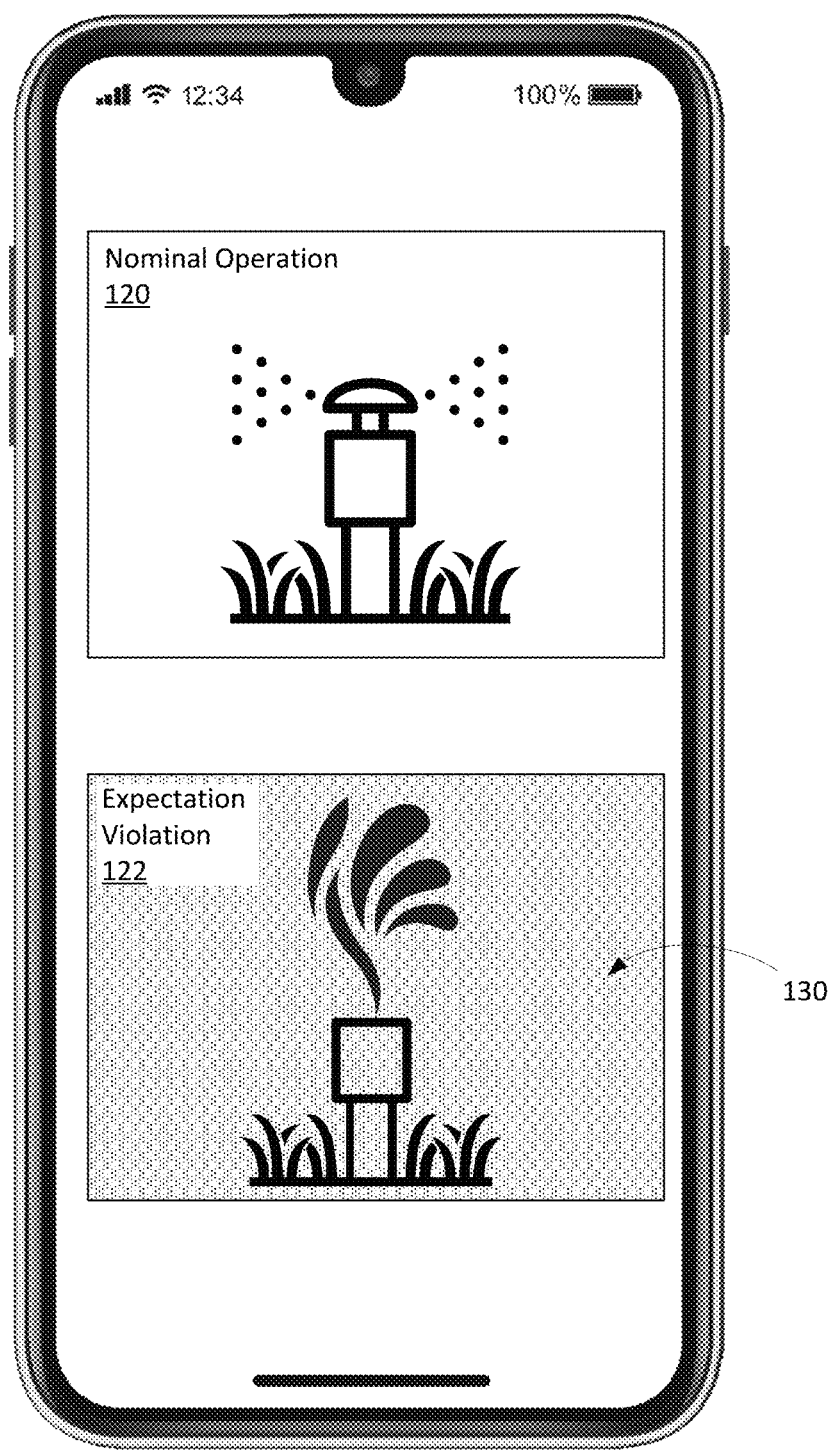
FIG. 11 is an illustration of a graphics user interface of a smartphone receiving a contrastive collage of images representing both nominal and exceptional observations wherein the image of the exception is rendered with modified graphic effects.

FIG. 11 shows an embodiment wherein a graphic alteration or color manipulation 130 is made in the image of the expectation violation 122 (for example, changing the color to a monochromatic red). The color manipulation may include changing the hue, saturation, bright or contrast. Additional graphic alternations may include adding indicia indicators, borders, text or filters to either the nominal or exceptional image. This assists the end user in immediately discerning what is expected (nominal operation) and the expectation violation (possible malfunction). While FIGS. 10-11 show the images above and below each other, they may be presented in a sequence such as in an animated GIF (graphics interchange format). Furthermore, embodiments of the invention may show the nominal and exception violation as animated loops to provide additional context and information to the end user to better understand the difference between the two.

Generating a contrastive collage for monitoring home automation systems serves a dual purpose: enabling intuitive visualization of the nominal state while simultaneously offering a comparative analysis of expectation-violating events. Given the multidimensional complexity of video, image and audio data streams, an effective implementation of such a contrastive collage (or sequence in the case of audio) would optionally include some preprocessing, post-processing, and visualization strategies.

At the outset, incoming visual data streams from the camera may undergo normalization and feature extraction. Algorithms like Convolutional Neural Networks (CNNs) can be deployed to segment and classify regions of interest in the visual frames. For example, the regions corresponding to a sprinkler system, lighting fixtures, or the entry point through which a child is expected to return home at a regularly scheduled time could be identified and demarcated. Additionally, a time-series analysis of these segmented regions using Recurrent Neural Networks (RNNs) or Long Short-Term Memory (LSTM) networks can capture the temporal dynamics of these elements, thereby allowing the system to associate specific segments with expected time-sensitive events. Such a time-series association becomes critical in defining the notion of "expected operation" in a rigorous manner.

Once the critical regions and their time-based associations are determined, the captured frames may be augmented by incorporating derivative visual markers such as contouring or heatmap overlay, effectively emphasizing the components in action. For example, the stream of water from a functioning sprinkler could be outlined, or the face of the arriving child could be highlighted. Conversely, during expectation violations, the absence of these elements could be marked by a color-inverted silhouette or a dynamic dashed outline pulsating at a frequency to indicate urgency. Such graphical markers could be generated by leveraging computer graphics libraries like OpenGL for real-time rendering or employing Shader Language for customized graphical effects.

To render this as a cohesive visual package, several additional techniques could be invoked. For a side-by-side comparison, techniques like alpha-blending or gradient-based fusion could be employed to seamlessly integrate the two images. For a more dynamic presentation, the two contrasting states-expected operation and expectation violation-could be compiled into an animated GIF or an HTML5-based animated vector graphic, employing a smooth transitional phase using cubic Bezier curves or spline-based interpolations for visual continuity. A further enhancement could be the application of a radiometric transformation, such as histogram equalization or gamma correction, to adjust the luminance levels or color balance of each frame, providing a heightened sense of contrast between the two states.

Beyond traditional visual rendering techniques, alternative paradigms could be implemented for a novel user experience. A Temporal Photo Slicing approach could splice together slivers of each frame at chronologically spaced intervals, rendering a single composite image that provides a continuous temporal cross-section of the evolving states. A multilayered approach, akin to the parallax effect, could be designed wherein each layer scrolls at a different speed, creating a sense of depth and making it easier for the end user to focus on anomalies. Alternatively, an interactive 3D mesh could be generated from the frames, thereby allowing the user to rotate, zoom, and explore the contrastive collage in a more immersive environment. Advanced techniques like Ray Tracing could be incorporated to simulate realistic lighting effects, thereby accentuating the contrast.

While a variety of techniques can be employed to accentuate the visual contrast between normal and anomalous states, the underlying objective remains the same: to facilitate the immediate cognitive recognition of expectation-violating events against a backdrop of nominal operational states. Leveraging a confluence of advanced machine learning algorithms, computer graphics techniques, and interactive user interface design, such a contrastive collage would serve as an integrative dashboard, offering a nuanced yet intuitive snapshot of the monitored environment's operational health.

Additionally, when a collage and/or sequence is sent to an end user, a deep link may be transmitted, allowing them to launch a specific smartphone configuration application for the home automation system.

Additional Use-Case Scenarios.

Scheduled Lights. The model could be trained on the standard on-off patterns of lights in the home. Should lights turn on or off outside of their normal schedule, a contrastive collage would be created and sent to the homeowner.

Garage Door Left Open. The system could be trained to recognize a closed garage door as the norm. If the door remains open for an extended period, an expectation violation is detected. A contrastive collage showing the garage door both closed and open would be generated and sent.

Anthropomorphic Form Near Light Switch. A machine vision process could be applied to recognize the shape of a human or anthropomorphic figure standing near a light switch. If no change in lighting is detected within a certain time frame, an anomaly is considered to have occurred, prompting the generation and transmission of a contrastive collage.

Unusual Wait Time for Elevator. Audio or visual cues could be used to detect when a person has pressed the elevator button. If the elevator takes an unusually long time to arrive, this is recognized as an expectation violation, and a contrastive collage or sequence is sent to the end user.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions, in fact, result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any non-transitory, tangible medium that can contain, or store a program for use by or in connection with an instruction execution system, apparatus, or device. Storage and services may be on-premise or remotely, such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer-readable storage medium, and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wireline, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA, and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Alpha-blending: A computational technique used in computer graphics to combine images based on their transparency levels. In the invention, alpha-blending could be utilized to overlay anomaly images onto nominal operation images to create a more informative contrastive collage.

Ambient Environment: The surrounding conditions in which a system operates, including temperature, lighting, and other variables that are not directly controlled by the system.

Anomalies: Variations or deviations from a quantified standard pattern of operation within a system. Anomalies are identified through specific statistical or machine learning models that can detect abnormalities in operational patterns. These models compare real-time operational data with established baseline data, identifying deviations that may signal errors, malfunctions, or unexpected behavior within a system.

Audiovisual Capture Apparatus: A set of devices that includes cameras and microphones. The cameras must have a minimum resolution of p1080, allowing for detailed visual capture, while the microphones must be capable of recording audio signals within a frequency range of 20 Hz to 20 kHz. These apparatuses are essential in-home automation systems for surveillance, interaction, and monitoring purposes.

Autoencoders: A type of artificial neural network used for unsupervised learning. Autoencoders are designed to encode input data as internal fixed-form representations in reduced dimensionality and then reconstruct the output from this representation. In the context of the invention, Autoencoders could capture complex interdependencies in the operational indicators, flagging subtle deviations as potential anomalies.

Automated Sprinkler System: An irrigation system electronically controlled to dispense water at specific intervals, times, and volumes. The system is regulated through electronic scheduling and environmental sensing, including soil moisture sensors, weather forecasts, and flow meters. It ensures efficient water usage in gardens, lawns, or agricultural fields, and can be part of broader home automation systems.

Auxiliary Irrigation System: A supplemental watering system designed to activate under predefined conditions, such as the failure of the primary irrigation system or specific environmental factors. This system can be controlled by quantitative sensors that measure soil moisture levels, temperature, and other critical parameters, thereby providing a contingency watering mechanism when needed.

Climate Control Systems: Systems that employ various technologies to regulate temperature, humidity, and air quality within defined ranges. They utilize sensors to measure current environmental conditions and controllers to adjust heating, cooling, humidifying, or dehumidifying components accordingly. These systems can be integrated into home automation environments to provide energy-efficient and comfortable living spaces.

Communication Module: A unit consisting of hardware and software components designed to manage and facilitate communication between non-integrated systems. The module operates according to specific communication protocols and standards, translating messages between different systems and enabling interoperability. It may include wired or wireless communication channels, encryption, and other security measures.

Convolutional Neural Networks (CNNs): A class of deep neural networks particularly suited for image recognition and computer vision tasks. The architecture includes multiple layers of artificial neurons that convolve the input data. In the context of the invention, a CNN could be used to process the image data captured by the digital camera during the initial training period, extracting operational indicators that are representative of the home automation system's nominal operation.

Contrastive Collage: A composite of images or data that juxtaposes normal operational indicators with those indicating expectation violations to facilitate rapid understanding of discrepancies.

Cubic Bezier Curves: Mathematical curves defined by four control points, used in computer graphics for creating smooth transitions. These curves could be employed to smoothly interpolate between different operational indicators or images when generating the contrastive collage.

Database of Operational Indicators: A structured, relational database that stores quantifiable signals reflecting the standard operation of a system. These indicators may include measurements, timestamps, event logs, and other quantified data essential for monitoring and pattern recognition. The database design includes tables, relationships, and constraints to ensure data integrity and retrieval efficiency.

Deep Link: A type of hyperlink that launches a specific application, not simply the default web browser. Deep links may also include parameters such as an indicator that an anomaly has been detected if the application is so developed to accept it.

Discovery Module: A software component that processes and analyzes captured data, employing specific algorithms to extrapolate quantifiable operational indicators. This module performs data preprocessing, feature extraction, and modeling, enabling the system to recognize and understand operational patterns. It provides insights into the underlying mechanisms of the system and contributes to monitoring and control functions.

Eclectic Combination: An assembly of various subsystems, integrated within a home automation environment through middleware. This integration facilitates the coordinated operation of different devices, such as security, climate control, and entertainment systems. Standard communication protocols are followed, and a common interface is provided to manage the various elements, ensuring a seamless user experience.

Epochs: One complete forward and backward pass of all the training examples, commonly used as a unit of measurement in machine learning training.

Expectation Violations: Quantifiable deviations from an established pattern, recognized by machine learning algorithms. These violations are measured through statistical testing against predefined norms or learned patterns. A violation occurs when observed data significantly differ from expected data, triggering alerts or actions within a system.

Gamma Correction: A technique used to encode and decode luminance in images. Gamma correction could be applied to the contrastive collage to make the images appear more natural to the human eye.

Gaussian Mixture Models (GMM): A probabilistic model employing a weighted sum of Gaussian distributions to represent the underlying data. The Expectation-Maximization algorithm is generally used for parameter estimation. For the invention, GMM could model complex, multi-modal distributions of operational states, making it easier to identify outlier events that may signify anomalies.

Gradient-based Fusion: A technique used in image processing for blending multiple images into a composite image. This could be applied in creating the contrastive collage by seamlessly combining the first nominal operation image and the second anomaly image based on their local gradients.

Hierarchical clustering: A clustering algorithm that builds a dendrogram, which represents nested levels of similarity between data points. This is accomplished either through agglomerative (bottom-up) or divisive (top-down) approaches. Within the invention, hierarchical clustering could elucidate nested relationships between different automation states, enhancing the system's capability to detect anomalies at multiple levels of abstraction.

High-Definition Cameras: Imaging devices capturing visual data at a resolution of at least p1080. These cameras offer a level of detail suitable for various applications within home automation, such as surveillance, object recognition, and facial recognition. They often come equipped with features like autofocus, zoom, infrared capability, and integration with other devices, such as motion detectors.

Histogram Equalization: An image processing technique that enhances the contrast of an image by redistributing pixel intensity levels. In the invention, this could be applied to improve the visibility of operational indicators or anomalies within the contrastive collage.

Home Automation Systems: Systems that enable automation and control of various household functions through a combination of hardware and software components. These systems can manage lighting, heating, security, and other household tasks by following industry-standard communication protocols. Home automation systems offer centralized control through user interfaces such as smartphones, tablets, or wall-mounted panels.

HTML5-based Animated Vector Graphic: Utilizes HTML5, CSS (cascading style sheets), and JavaScript to create scalable and resolution-independent animations. This technology could be used to animate the contrastive collage or other interface elements to better convey the context of expectation violations to the end user.

Illumination Systems: Technologically driven lighting management systems that provide control over brightness, color, timing, and other attributes. Brightness can be measured in candela, and color in Kelvin, with adjustments made through dimmers, color control units, or programmable controllers. These systems can be part of broader home automation, offering energy-saving, ambiance creation, and adaptive lighting solutions.

Interactive 3D Mesh: A polygonal model that represents a 3D object and allows for real-time manipulation. In the invention, an interactive 3D mesh could be used to represent the premises or components of the home automation system, enabling the end user to explore anomalies in a more immersive manner.

Isolation Forests: An ensemble-based algorithm designed for anomaly detection that isolates anomalies rather than normal instances. It partitions the feature space recursively and identifies outliers based on the number of splits required to isolate them. In the invention, Isolation Forests could provide efficient real-time anomaly detection given their ability to handle high-dimensional data.

K-means clustering: A partitioning method that segregates n-dimensional data points into 'k' non-overlapping clusters. The algorithm iteratively assigns data points to the nearest centroid, and updates the centroid based on the mean of the points within the cluster. In the context of the invention, K-means clustering could categorize operational indicators into discrete clusters, aiding in the definition of 'normal' behavior against which anomalies could be detected.

Intermediary Communication Channel: A communication pathway facilitating interaction between discrete, non-integrated systems. This channel employs middleware that utilizes specific communication techniques and protocols to bridge differences in data format, transmission rate, or other attributes between systems. It plays a crucial role in integrating various subsystems within a heterogeneous environment, such as home automation.

Long Short-Term Memory (LSTM) networks: A specialized RNN architecture designed to mitigate the vanishing gradient problem, allowing the network to learn long-term dependencies. LSTMs could be applied in the invention to analyze long sequences of operational indicators, effectively building a model of normalcy over extended periods.

Loss Function: A mathematical function that calculates the difference between the predicted output and the actual output (ground truth), aiming to minimize this difference during the training of a machine learning model.

Machine Learning Module: An assembly of algorithms that employs specific learning methods, trained to recognize quantifiable patterns in data. The module can be supervised or unsupervised and may utilize techniques like regression, classification, clustering, or anomaly detection. It is crafted to adapt to new data and make predictions or decisions without being explicitly programmed for the task.

Machine Vision Process: A computational procedure that interprets and analyzes visual information from the world, typically through a digital camera, to produce operational indicators or other types of meaningful data.

Middleware: A software layer that acts as a bridge between different operating systems or applications. It provides essential services for communication and data management, using a defined architecture such as message-oriented middleware or object request brokers. Middleware enables different systems to communicate and share data without direct integration, promoting modularity and scalability.

Nominal Operation: The standard, expected functioning of a system under normal or predefined conditions.

Notification Alert: An automated message generated through rule-based algorithms to notify users or systems of specific, quantifiable events. These alerts can be transmitted through various channels like email, SMS, push notifications, or visual indicators, depending on the nature and urgency of the notification. They play a vital role in keeping users informed and systems responsive.

One-Class Support Vector Machines: A variant of SVMs trained only on the data representing the 'normal' state. It constructs a hyperplane in a high-dimensional space to separate normal behavior from outliers. In this invention, One-Class SVMs could be used to identify novel anomalies by training exclusively on nominal operation data.

OpenGL: A cross-platform graphics rendering API used for generating 2D and 3D graphics. OpenGL could be employed to create the visual contrastive collage that is transmitted to the end user, especially if 3D visualizations are needed for depicting operational statuses.

Operational Indicators: Quantifiable metrics derived from multi-modal sensor data intrinsic to the home automation system, including but not limited to video streams, digital microphone outputs, and other performance metrics such as system states. These indicators are formalized using unsupervised machine learning models like K-means clustering, Gaussian Mixture Models, and Principal Component Analysis, among others, as delineated in the invention. These operational indicators serve as the baseline for real-time anomaly detection, functioning as the comparative dataset against which deviations are measured to flag anomalous events.

Parallax Effect: A visual illusion where objects appear to move at different speeds based on their distance from the viewer. This could be used to add depth to the contrastive collage, aiding in the conveyance of operational context.

Principal Component Analysis (PCA): A dimensionality reduction technique that transforms the original variables into a new set of uncorrelated variables, known as principal components, which are linear combinations of the original variables. In the invention, PCA could be applied to high-dimensional image and audio data to extract the most informative features for more efficient anomaly detection.

Proxy Communication Channel: An indirect communication link that employs specific protocols and techniques to establish a connection between non-integrated systems. This channel acts as a substitute for direct communication, translating and routing messages between systems. It can be implemented through hardware or software components and may include encryption or other security measures.

Radiometric Transformation: A systematic alteration of image pixel intensities. This could be applied to the color manipulation step for an anomaly image enhancing its visual distinction from the nominal operation images.

Ray Tracing: A rendering technique that simulates the physical behavior of light to produce realistic images. While computationally intensive, ray tracing could be employed to create a highly detailed contrastive collage or other visualizations to represent the operational status of the home automation system.

Recurrent Neural Networks (RNNs): A type of neural network optimized for sequential data handling. RNNs maintain a hidden state across time steps to capture temporal dependencies. They could be employed to analyze sequences of image or audio data over time, identifying patterns or anomalies in the operation of the home automation system.

Security Apparatus: A set of devices, including detectors and cameras with a minimum resolution of p1080, used to surveil and respond to quantifiable security-related events. The apparatus may include motion detectors, door/window sensors, smoke alarms, and integration with a central control unit. It ensures comprehensive security coverage within the context of home automation.

Spline-based Interpolations: Techniques used to approximate data points with polynomial segments connected smoothly. In the invention, spline-based interpolations could be used to create smooth transitions in the contrastive collage or in the representation of operational indicators.

Stopping Criterion: A predefined condition or set of conditions that, when met, halts the training of a machine learning model.

Temporal Photo Slicing: A technique combining slices of multiple images over time into a single composite image. This could be employed in the invention to create a time-based contrastive collage, visually representing changes in the operational status over a period.

Unsupervised Machine Learning Model: A machine learning model that finds patterns in data without being explicitly programmed to perform a specific task, typically by identifying clusters or anomalies.

Validation Set: A subset of data used to provide an unbiased evaluation of a machine learning model during training.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for extrinsic visual monitoring of an operational status of a home automation system on a premises, the method comprising the steps of:
    a. processing image data representative of nominal operation of the home automation system with a computer processor, the computer processor applying a machine vision process to extrapolate operational indicators from the ambient environment of the premises representative of nominal operation of the home automation system;
    b. training an unsupervised machine learning model with the operational indicators to build a model of normalcy and detect expectation violations in the operational pattern of the home automation system;
    c. concluding the initial training period when a stopping criterion for the unsupervised machine learning model is met;
    d. initiating expectation violation monitoring of the home automation system responsive to the conclusion of the initial training period, a digital camera capturing substantially real-time image data to an image store which is processed by the model to confirm nominal operation and to detect expectation violations;
    e. responsive to detecting an expectation violation, generating a contrastive collage comprising images retrieved from the image store, the retrieved images including a first nominal operation image and a second anomaly image of the expectation violation; and
    f. transmitting the contrastive collage to an end user of the home automation system wherein the context of the expectation violation is visually conveyed to the end user by the contrastive collage.

2. The method of claim 1 further comprising the step of color manipulating the second anomaly image of the expectation violation.

3. The method of claim 1 further comprising the step of transmitting to the end user a deep link to launch a smartphone configuration application of the home automation system.

4. The method of claim 1 wherein the image data in the initial training period is archived from prior, known nominal operation of the home automation system to form a validation set against which the unsupervised machine learning model is trained.

5. The method of claim 1 wherein the stopping criterion is met when the unsupervised machine learning model has reached a predetermined accuracy on the validation set of at least 80%.

6. The method of claim 1 wherein stopping criterion is met when the unsupervised machine learning model has been trained for at least 72 hours of observation.

7. The method of claim 1 wherein stopping criterion is met when the unsupervised machine learning model has reached a point where a loss function for the unsupervised machine learning model has stopped decreasing for a predetermined number of epochs between 10 and 100.

8. A method for extrinsic audible monitoring of an operational status of a home automation system on a premises, the method comprising the steps of:
    a. processing audio data representative of nominal operation of the home automation system with a computer processor, the computer processor applying an auditory scene analysis to extrapolate operational indicators from the ambient environment of the premises representative of nominal operation of the home automation system;
    b. training an unsupervised machine learning model with the operational indicators to build a model of normalcy and detect expectation violations in the operational pattern of the home automation system;
    c. concluding the initial training period when a stopping criterion for the unsupervised machine learning model is met;
    d. initiating expectation violation monitoring of the home automation system responsive to the conclusion of the initial training period, a digital microphone capturing substantially real-time audio data to an audio store which is processed by the model to confirm nominal operation and to detect expectation violations;
    e. responsive to detecting an expectation violation, generating a contrastive sequence comprising audio retrieved from the audio store, the retrieved audio including a first nominal operation audio clip and a second anomaly audio clip of the expectation violation; and
    f. transmitting the contrastive sequence to an end user of the home automation system wherein the context of the expectation violation is audibly conveyed to the end user by the contrastive sequence.

9. The method of claim 8 further comprising the step of transmitting to the end user a deep link to launch a smartphone configuration application of the home automation system.

10. The method of claim 8 wherein the audio data in the initial training period is archived from prior, known nominal operation of the home automation system to form a validation set against which the unsupervised machine learning model is trained.

11. The method of claim 8 wherein the stopping criterion is met when the unsupervised machine learning model has reached a predetermined accuracy on the validation set of at least 80%.

12. The method of claim 8 wherein stopping criterion is met when the unsupervised machine learning model has been trained for at least 72 hours of observation.

13. The method of claim 8 wherein stopping criterion is met when the unsupervised machine learning model has reached a point where a loss function for the unsupervised machine learning model has stopped decreasing for a predetermined number of epochs between 10 and 100.

14. The method of claim 8 wherein the auditory scene analysis is performed by spectrograms.

15. The method of claim 8 wherein the auditory scene analysis is performed by temporal coherence.

16. The method of claim 8 wherein the digital microphone is integral to a digital camera, the method further comprising the steps of:
   a. generating an audiovisual clip by combining a first image of nominal operation captured by the digital camera and correlated to the first nominal operation audio clip and combining a second image of anomalous operation captured by the digital camera and correlated to the second anomaly audio clip of the expectation violation; and
   b. generating a contrastive audiovisual collage comprising the first and second images and the first and second audio clips; and
   c. transmitting the contrastive audiovisual collage to an end user of the home automation system wherein the context of the expectation violation is audio-visually conveyed to the end user by the contrastive audiovisual collage.

17. A method for extrinsic audible monitoring of an operational status of a home automation system on a premises, the method comprising the steps of:
   a. processing audio data with a computer processor, the computer processor applying an auditory scene analysis to extrapolate operational indicators from the ambient environment of the premises representative of nominal operation of the home automation system;
   b. training an unsupervised machine learning model with the operational indicators to build a model of normalcy and detect expectation violations in the operational pattern of the home automation system;
   c. concluding the initial training period when a stopping criterion for the unsupervised machine learning model is met;
   d. initiating expectation violation monitoring of the home automation system responsive to the conclusion of the initial training period, a digital camera having a digital microphone capturing substantially real-time audio data to an audio store which is processed by the model to confirm nominal operation and to detect expectation violations;
   e. responsive to detecting an expectation violation, generating a contrastive collage comprising images retrieved from an image store, the retrieved images including a first nominal operation image and a second anomaly image captured concurrently with the expectation violation identified by the real-time audio data; and
   f. transmitting the contrastive collage to an end user of the home automation system wherein the context of the audibly-detected expectation violation is visually conveyed to the end user by the contrastive collage.

* * * * *